United States Patent
Goldman et al.

(10) Patent No.: US 7,623,649 B2
(45) Date of Patent: Nov. 24, 2009

(54) MLPP TELEPHONE EMULATION

(75) Inventors: Stuart O. Goldman, Scottsdale, AZ (US); Kevin M. Patfield, Phoenix, AZ (US)

(73) Assignee: Alcatel-Lucent USA Inc., Murray Hill, NJ (US)

(*) Notice: Subject to any disclaimer, the term of this patent is extended or adjusted under 35 U.S.C. 154(b) by 1006 days.

(21) Appl. No.: 10/954,514

(22) Filed: Sep. 30, 2004

(65) Prior Publication Data

US 2006/0067504 A1    Mar. 30, 2006

(51) Int. Cl.
*H04M 7/00*    (2006.01)

(52) U.S. Cl. .............................. 379/221.08; 379/93.17

(58) Field of Classification Search ................ 379/279, 379/221, 112, 207, 221.08, 93.17, 201.12; 455/445, 408
See application file for complete search history.

(56) References Cited

U.S. PATENT DOCUMENTS 6,985,740 B2 *   1/2006   Shyy et al. .................. 455/453
7,292,858 B2 *   11/2007  Forte ........................... 455/445
2005/0163126 A1 *   7/2005   Bugenhagen et al. .... 370/395.2

* cited by examiner

*Primary Examiner*—Curtis Kuntz
*Assistant Examiner*—Amal Zenati
(74) *Attorney, Agent, or Firm*—Carmen Patti Law Group, LLC

(57) ABSTRACT

A system that implements the display of the well-recognized MLPP keypad generated by a computer-based application adaptable for any authorized user. In one embodiment in accordance with the present invention, a system is provided for emulating an MLPP telephone. The exemplary system comprises a data entry portion that accepts telephone call initiation information, including MLPP priority information, from a user, and an information display portion that displays information relating to the data entry portion. In one form of the invention, the data entry portion comprises a visual representation, on a display device, of an MLPP telephone keypad, and a data input device. The visual representation, on a display device, may be a visual representation on a video display terminal associated with a personal computer.

18 Claims, 2 Drawing Sheets

MLPP TELEPHONE EMULATION

TECHNICAL FIELD

The invention relates generally to telephone communication and in particular to a system that supports MLPP communication, and is more particularly directed toward a system that provides MLPP telephone communication without a physical MLPP telephone instrument.

BACKGROUND

Multilevel Precedence and Preemption (MLPP) designates a priority scheme generally employed in military communication networks that assigns one of several precedence levels to specific calls or messages so that the system handles them in a predetermined order and time frame. MLPP can be used for gaining controlled access to network resources in which calls and messages can be preempted only by higher priority calls and messages. As a general principle, MLPP protocols are recognized only within a predefined domain, and the precedence level of a call outside the predefined domain is usually not recognized, but may continue to be transported transparently.

As noted, MLPP allows users on a special, private network the ability to signal explicitly the priority of a call as it is being set up. MLPP callers normally use a special telephone that includes an extra column of four buttons on the right side to allow the user to signal the priority for the call being placed. Since these are special telephones, their availability is limited and effort is required to install, move, and remove such telephones. While it is possible for a knowledgeable user to enter a series of special code sequences from a standard telephone keypad to activate the priority features, many users are infrequent users and only use the MLPP capability during an emergency. Consequently, users cannot generally recall the necessary codes, especially when lack of recent use is considered in light of the stress of a current emergency.

Thus, a need exists for a system that provides enhanced MLPP features without the need for a physical MLPP telephone instrument.

SUMMARY

These needs and others are satisfied by the present invention, which implements the screen display of the well-recognized MLPP keypad generated by a computer-based application adaptable for any authorized user. Since it is a software function in the agent serving the subscriber, it can be easily given to any subscriber authorized for such service. During an emergency situation, additional users can quickly be given MLPP capability as soon as they are authorized. Since the software would normally be pre-positioned in the agent, access is available as soon as the user becomes authorized. In addition, software implementation allows enhancements not available to users of a physical MLPP instrument. An example of such an enhancement would be positioning the cursor over one of the special buttons and getting a pop-up with an explanation of the use of the particular button.

In one embodiment in accordance with the present invention, a system is provided for emulating an MLPP telephone. The exemplary system comprises a data entry portion that accepts telephone call initiation information, including MLPP priority information, from a user, and an information display portion that displays information relating to the data entry portion. In one form of the invention, the data entry portion comprises a visual representation, on a display device, of an MLPP telephone keypad, and a data input device. The visual representation, on a display device, may be a visual representation on a video display terminal associated with a personal computer.

In one form of the invention, the data input device comprises a cursor-control device that allows a user to position a cursor, depicted on the display device, such that the cursor indicates a user-selected key of the MLPP keypad, and to provide at least two distinct input signals. One of the two distinct input signals is a data selection input signal that initiates a response from the system equivalent to depressing the indicated key of the MLPP keypad. The other of the two distinct input signals, in one embodiment, is an information request signal that causes information relating to the indicated key to be displayed on the display device.

The inventive system may further comprise an audio interface portion that emulates telephone system audio communication consistent with a conventional (POTS) telephone set. The audio interface portion may be an associated conventional (POTS) telephone set, or the audio interface portion, such as a USB handset, may be provided by a personal computer that also hosts the data entry portion and the information display portion.

DESCRIPTION OF THE DRAWINGS

Features of exemplary implementations of the invention will become apparent from the description, the claims, and the accompanying drawings in which:

DETAILED DESCRIPTION

Figure 1:
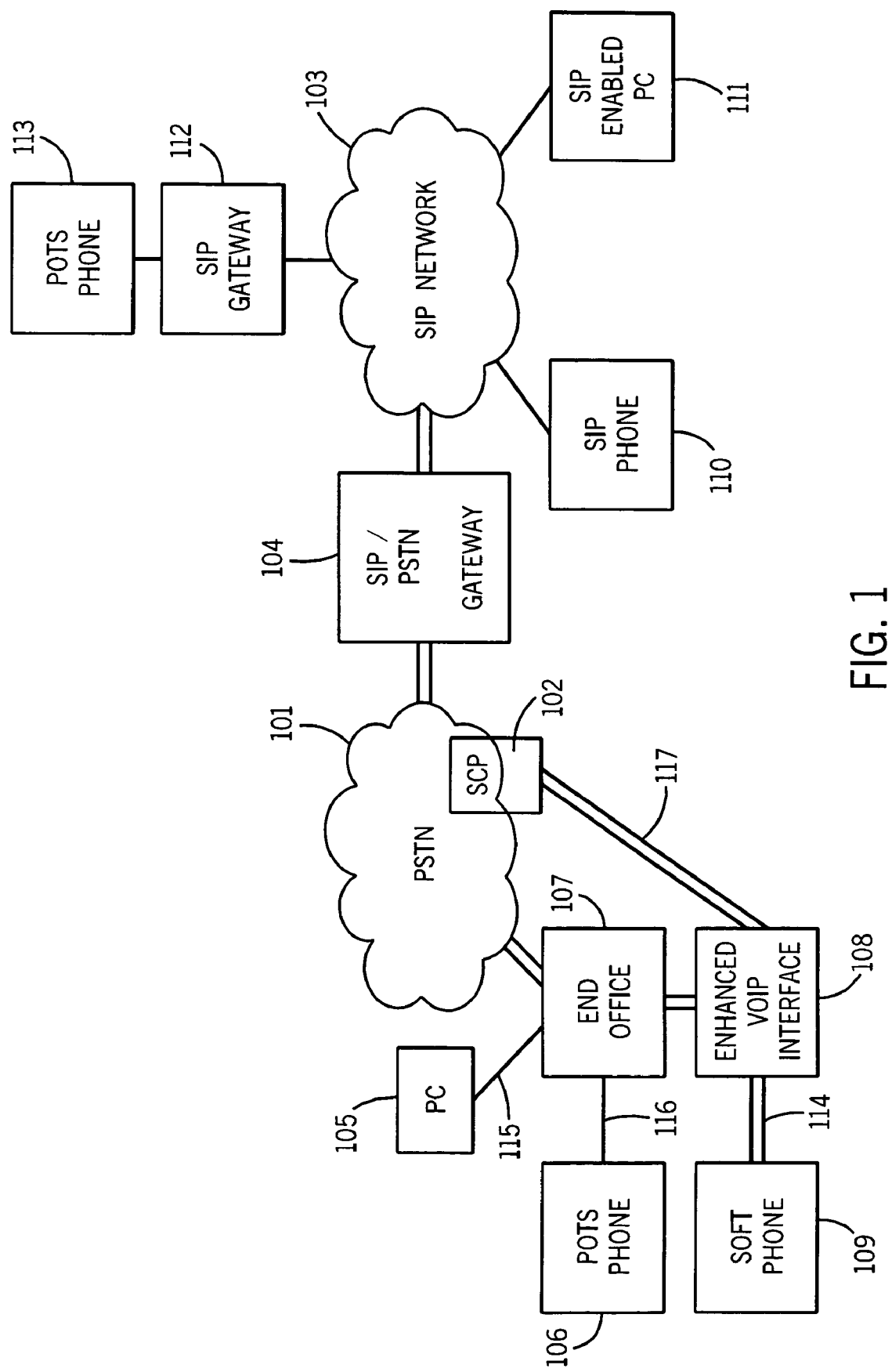
FIG. 1 is a representation of communication networks supporting a plurality of implementations of a system in accordance with the present invention.

Turning to FIG. 1, the Public Switched Telephone Network, or PSTN 101, supports communication with a variety of end instruments. A personal computer 105, for example, may be interconnected by modem to an Internet Service Provider (not illustrated in the figure) and thus to the PSTN. A POTS (Plain Old Telephone Set) telephone 106, or conventional telephone instrument, is connected to the PSTN 101 via ordinary outside plant structures to an end office 107. In one form of the present invention, to be described in more detail subsequently, the conventional telephone instrument 106 is utilized to provide telephone audio communication, while an associated PC (personal computer) 105 provides an MLPP keypad application and available enhancements.

A complete "soft" telephone installation 109 can also be implemented through connection to a VOIP (voice over Internet Protocol) interface 108. The soft phone 109 itself can be completely implemented using a PC in a known manner. In one embodiment, the soft phone 109 is connected to a VOIP interface 108 using a broadband connection 114 rather than dial-up, in order to provide high quality audio. Of course, the connection 114 could be merely high speed, such as is available using ISDN, rather than a true broadband connection such as can be obtained using DSL or cable modem connections. A soft phone 109 implementation of the system of the present invention has the advantage of integrated visual display and operation of the MLPP keypad with audio capability in the same device (a PC 109 in the drawing). The audio interface may be advantageously provided through a handset connected to the PC over the universal serial bus (UBS).

In operation, an agent with the PSTN network 101 receives messages based upon subscriber interaction with the "soft" MLPP telephone 109, decodes the messages, and performs authentication. The agent then establishes the call requested by the message if appropriate resources are available at the requested priority. Thus, in a situation where the caller has requested a priority call to another party, the call is established using the MLPP software, but without requiring that the user have a physical MLPP instrument. Possible implementations of the mechanism for sending the original request include a small application running on the PC that implements the soft phone 109, or on a PDA (Personal Digital Assistant) or other computer-based display device, and used by the caller to request the call at an associated PSTN telephone 106, and a user agent accessed via a web page from a browser running an any IP-connected PC 105 or PDA.

The soft MLPP telephone implementation is compatible with the many enhanced VOIP interface products that provide a VOIP interface to existing TDM switches. In the exemplary system of FIG. 1, the VOIP interface 108 provides IP signaling to the SCP (service control point) 102 in the PSTN 101 over an IP connection 117 that has both IP signaling and TCAP (the transaction capability application part of intelligent network signaling, commonly known as Signaling System 7, or SS7). In one implementation, a gateway 104 is provided between the PSTN 101 and a private network 103 utilizing SIP signaling (session initiation protocol) to connect to a variety of SIP telephone sets 110, SIP-enabled PCs 111, and (through additional gateways 112) POTS telephone sets 113, as well.

Although there are currently available products that support a number of IP and SIP telephone features, limitations are imposed by a dependence upon line-side communication into the end office 107. For example, some applications must wait for the end office 107 to provide dial tone. This dependence upon in-band signaling can be removed if a software-based application is provided that can use IP signaling to the SCP 102 in the PSTN 101 that has both IP and SS7 TCAP signaling. SIP is being enhanced to indicate when a request from a user requires priority access to network resources (such as proxies, User Agents, and PSTN gateways).

A SIP resource priority header can be used to indicate that a request needs priority treatment. Under the protocol, the header is included in an INVITE for a session requiring priority treatment, both during session establishment and during active phases of the session. The Resource-value parameter in the Resource-priority header indicates the resource priority desired by the originator. The resource value is formatted as "namespace.priority value." The "priority value" indicates the priority level of the call in the priority scheme indicated by the "namespace" value.

Initial namespaces specified are "dsn," "q735," and "DSRN." The namespace "dsn" indicates Defense Switched Network and allows priority values of "flash-override," "flash," "immediate," "priority," and "routine." The namespace "q735" supports interworking with ITU-T Recommendation Q.735.3 ISDN MLPP entities, and is meant to allow carrying information between Q.735.3 entities through a SIP network without loss of information. One or both of the SIP endpoints could be PSTN gateways. The namespace contains priority from 0 through 4, where 0 is the highest priority and 4 is the lowest.

Figure 2:
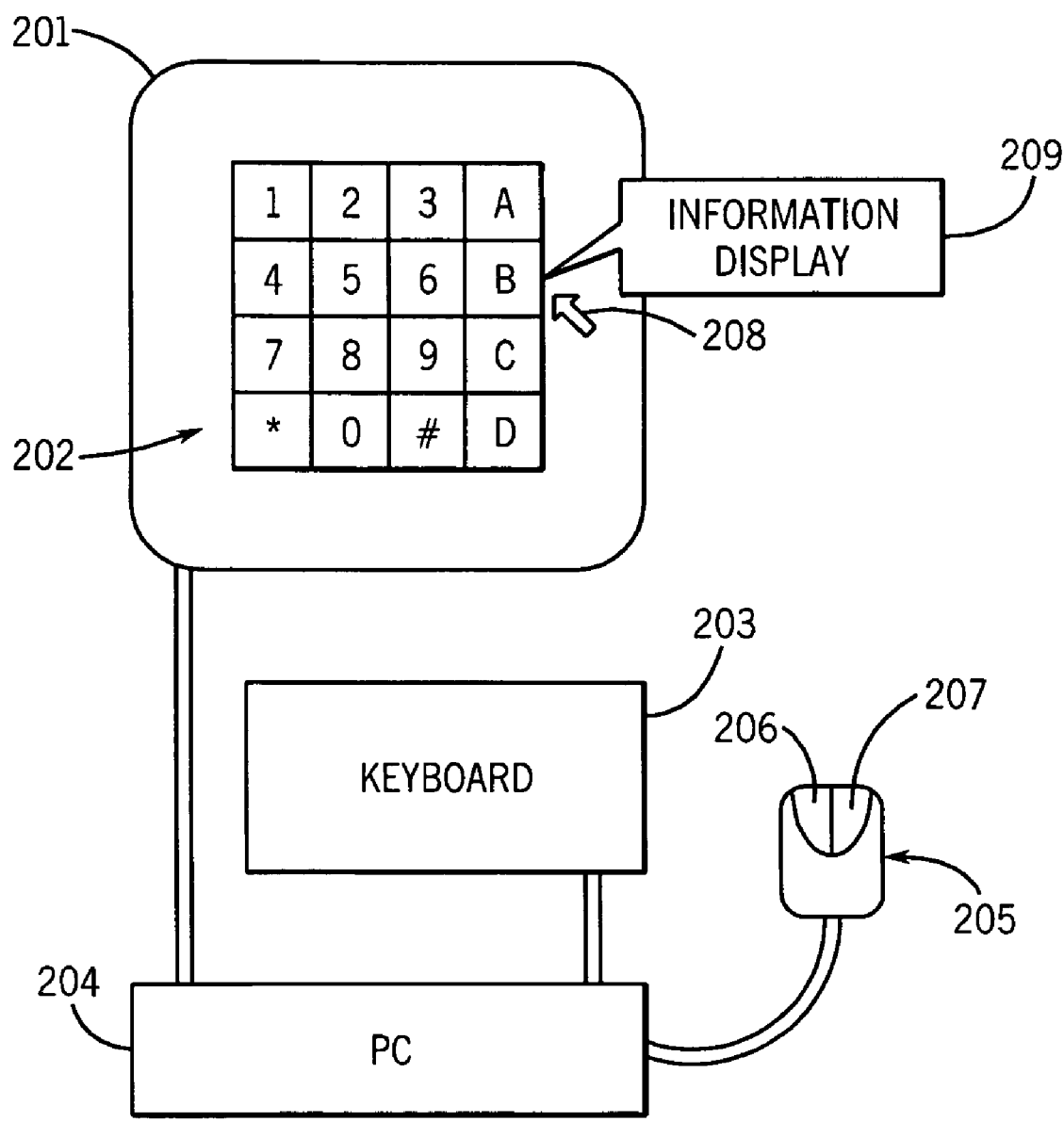
FIG. 2 is a representation of one exemplary embodiment of a system in accordance with the present invention.

An illustrative description of exemplary operation of the system in accordance with the present invention is presented, for explanatory purposes, in conjunction with FIG. 2. A display device 201, such as a video display terminal, displays a visual representation of a MLPP keypad 202. A position indicator, such as the commonly-used cursor 208 of a PC display, is utilized in this example. Of course, the display device could also by a PDA, with the stylus normally associated with the PDA being used for data entry through activation of appropriate buttons presented on the display device. The stylus can also provide an information request signal, such as through activation of distinct information buttons, or selection areas, associated with the MLPP keypad display on the PDA.

However, in the exemplary system, a data entry device such as a mouse 205 is used to position the cursor 208 next to or over the appropriate keypad button, in this case button "B." In order to signify a keypress of the appropriate button, the left mouse button 206 is depressed. In a situation where the user does not appreciate the significance of a particular button on the keypad, or desires more information, the right hand mouse button 207 is depressed by the user, and an information display 209, or pop-up, appears to provide the user with additional information associated with the indicated key on the keypad display 202.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A system for emulating an MLPP telephone without a need for a physical MLPP telephone instrument by using a software function that provides screen display of a well-recognized MLPP keypad generated by a computer-based application adaptable for any authorized user so that a user need not enter a series of special code sequences from a standard telephone keypad to activate priority features of an associated system, the system comprising:

a display device configured to display a visual representation of a data entry portion that accepts telephone call initiation information, including MLPP priority information, from a user; and an information display portion that displays information relating to the data entry portion;

wherein at least part of the system is connected to a PSTN utilizing Internet protocol (IP), wherein the audio interface is accomplished utilizing voice over Internet protocol (VOIP, wherein call initiation signaling with the PSTN is accomplished using out-of-band signaling through a SCP of the intelligent network, wherein call initiation signaling with the PSTN is accomplished using out-of-band signaling via a gateway provided between the PSTN and a private network utilizing SIP signaling (session initiation protocol), and wherein a SIP resource priority header is used to indicate that a request needs priority treatment.

2. The system in accordance with claim 1, wherein the data entry portion comprises:

a visual representation, on the display device, of an MLPP telephone keypad; and a data input device.

3. The system in accordance with claim 2, wherein the visual representation, on a display device, comprises a visual representation on a video display terminal associated with a personal computer.

4. The system in accordance with claim 2, wherein the data input device comprises a cursor-control device that allows a user to position a cursor, depicted on the display device, such that the cursor indicates a user-selected key of the MLPP keypad, and to provide at least two distinct input signals.

5. The system in accordance with claim 4, wherein one of the said at least two distinct input signals is a data selection input signal that initiates a response from the system equivalent to depressing the indicated key of the MLPP keypad.

6. The system in accordance with claim 4, wherein one of the said at least two distinct input signals is an information request signal that causes information relating to the indicated key to be displayed on the display device.

7. The system in accordance with claim 1, further comprising a standard audio interface portion that emulates telephone system audio communication consistent with a conventional (POTS) telephone set.

8. The system in accordance with claim 7, wherein the audio interface portion comprises an associated conventional (POTS) telephone set.

9. The system in accordance with claim 7, wherein the audio interface portion is provided by a personal computer that also hosts the data entry portion and the information display portion.

10. The system in accordance with claim 9, wherein the audio interface portion comprises a USB handset.

11. A system for emulating an MLPP telephone without a need for a physical MLPP telephone instrument by using a software function that provides screen display of a well-recognized MLPP keypad generated by a computer-based application adaptable for any authorized user so that a user need not enter a series of special code sequences from a standard telephone keypad to activate priority features of an associated system, the system comprising:

a data entry portion including a visual representation, on a display device, of an MLPP telephone keypad, and a data input device, wherein the data entry portion accepts telephone call initiation information, including MLPP priority information, from a user;

an information display portion responsive to an information request signal that causes information relating to an indicated key of the MLPP telephone keypad to be displayed on the display device; and an audio interface portion that emulates telephone system audio communication;

wherein at least art of the system is connected to the PSTN utilizing Internet protocol (IP), wherein the audio interface is accomplished utilizing voice over Internet protocol (VOIP, wherein call initiation signaling with the PSTN is accomplished using out-of-band signaling through a SCP of the intelligent network, wherein call initiation signaling with the PSTN is accomplished using out-of-band signaling via a gateway provided between the PSTN and a private network utilizing SIP signaling (session initiation protocol), and wherein a SIP resource priority header is used to indicate that a request needs priority treatment.

12. The system in accordance with claim 11, wherein the data input device comprises a cursor-control device that allows a user to position a cursor, depicted on the display device, such that the cursor indicates a user-selected key of the MLPP keypad, and to provide at least two distinct input signals.

13. The system in accordance with claim 12, wherein one of the said at least two distinct input signals is a data selection input signal that initiates a response from the system equivalent to depressing the indicated key of the MLPP keypad.

14. The system in accordance with claim 12, wherein one of the said at least two distinct input signals is an information request signal that causes information relating to the indicated key to be displayed on the display device.

15. The system in accordance with claim 11, wherein the audio interface portion emulates telephone system audio communication consistent with a conventional (POTS) telephone set.

16. The system in accordance with claim 11, wherein at least part of the system is connected to the PSTN using a modem.

17. The system in accordance with claim 16, wherein call initiation signaling with the PSTN is accomplished using in-band signaling after detecting end-office dial tone.

18. A system for emulating an MLP telephone without a need for a physical MLPP telephone instrument by using a software function that provides screen display of a well-recognized MLPP keypad generated by a computer-based application adaptable for any authorized user so that a user need not enter a series of special code sequences from a standard telephone keypad to activate priority features of an associated system, the system comprising:

a data entry portion including a visual representation, on a display device, of an MLPP telephone keypad, and a data input device, wherein the data entry portion accepts telephone call initiation information, including MLPP priority information, from a user, wherein the data input device interacts with the visual representation to indicate a user-selected key of the MLPP keypad and to provide an information request signal;

an information display portion responsive to the information request signal that causes information relating to an indicated key of the MLPP telephone keypad to be displayed on the display device; and an audio interface portion that emulates telephone system audio communication;

wherein at least part of the system is connected to the PSTN utilizing Internet protocol (IP), wherein the audio interface is accomplished utilizing voice over Internet protocol (VOIP, wherein call initiation signaling with the PSTN is accomplished using out-of-band signaling through a SCP of the intelligent network, wherein call initiation signaling with the PSTN is accomplished using out-of-band signaling via a gateway provided between the PSTN and a private network utilizing SIP signaling (session initiation protocol), and wherein a SIP resource priority header is used to indicate that a request needs priority treatment.

* * * * *

UNITED STATES PATENT AND TRADEMARK OFFICE
CERTIFICATE OF CORRECTION

PATENT NO.       : 7,623,649 B2
APPLICATION NO.  : 10/954514
DATED            : November 24, 2009
INVENTOR(S)      : Goldman et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1255 days.

Signed and Sealed this

Fourteenth Day of December, 2010

David J. Kappos
*Director of the United States Patent and Trademark Office*